(12) United States Patent
Folkers et al.

(10) Patent No.: US 11,021,977 B2
(45) Date of Patent: Jun. 1, 2021

(54) DIFFUSER GUIDE VANE WITH DEFLECTOR PANEL HAVING CURVED PROFILE

(71) Applicant: Chromalloy Gas Turbine LLC, Palm Beach Gardens, FL (US)

(72) Inventors: Daniel L. Folkers, Stuart, FL (US); Zhenhua Xiao, West Palm Beach, FL (US); Vincent C. Martling, Wellington, FL (US); Mariano Medrano, Okeechobee, FL (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 188 days.

(21) Appl. No.: 16/179,378

(22) Filed: Nov. 2, 2018

(65) Prior Publication Data
US 2020/0141250 A1 May 7, 2020

(51) Int. Cl.
*F01D 9/02* (2006.01)
*F02C 7/18* (2006.01)
(Continued)

(52) U.S. Cl.
CPC ............... *F01D 9/02* (2013.01); *F01D 9/023* (2013.01); *F01D 25/12* (2013.01); *F02C 7/18* (2013.01); *F02C 7/20* (2013.01); *F05D 2240/12* (2013.01); *F05D 2240/35* (2013.01); *F05D 2250/74* (2013.01); *F05D 2260/20* (2013.01)

(58) Field of Classification Search
CPC . F01D 9/04; F01D 9/047; F01D 9/023; F01D 17/16; F01D 17/162; F01D 25/12; F01D 25/24; F04D 29/54; F04D 29/547; F04D 29/541; F04D 29/542; F04D 29/023; F04D 29/644; F05D 2250/20; F05D 2250/70; F05D 2250/71; F05D 2250/711; F05D 2250/712; F05D 2250/713;
(Continued)

(56) References Cited

U.S. PATENT DOCUMENTS 2,541,170 A * 2/1951 Mayers .................... F23R 3/02
60/751
3,759,038 A * 9/1973 Scalzo .................... F01D 9/023
60/800
(Continued)

OTHER PUBLICATIONS

International Search Report and Written Opinion issued by the International Searching Authority regarding Application No. PCT/US2019/059387, dated May 18, 2020, 6 pages.

*Primary Examiner* — Alain Chau
(74) *Attorney, Agent, or Firm* — Avant Law Group, LLC

(57) ABSTRACT

A guide vane for use in a compressor discharge plenum of a gas turbine engine is disclosed. The guide vane comprises a guide support system, a first side panel, a second side panel, and a deflector panel secured to the mounting system and extending between the first side panel and the second side panel. The deflector panel has a curved profile substantially in accordance with Cartesian coordinate values of X, Y, and Z as set forth in Table 1 where the X, Y, and Z values are in inches from a center point of a bottom surface of the deflector panel. The coordinate values are connected by smooth continuing arcs to form profile sections and the profile sections are joined together smoothly to form the curved profile of the guide vane.

20 Claims, 8 Drawing Sheets

(51) Int. Cl.
*F02C 7/20* (2006.01)
*F01D 25/12* (2006.01)

(58) Field of Classification Search
CPC ............ F05D 2250/74; F05D 2240/12; F05D 2240/35; F23R 3/04; F23R 3/60; F02C 7/20
See application file for complete search history.

(56) References Cited

U.S. PATENT DOCUMENTS

| | | | | |
|---|---|---|---|---|
| 5,697,209 A * | 12/1997 | Wettstein | ............... | F02C 3/30 415/116 |
| 6,554,569 B2 * | 4/2003 | Decker | ............... | F01D 5/141 415/192 |
| 6,672,070 B2 * | 1/2004 | Bland | ............... | F01D 9/023 60/39.37 |
| 7,047,723 B2 * | 5/2006 | Martling | ............... | F01D 9/023 60/39.37 |
| 7,909,300 B2 * | 3/2011 | Kidder | ............... | F01D 5/141 248/346.5 |
| 8,438,855 B2 * | 5/2013 | Schott | ............... | F01D 17/16 60/751 |
| 8,616,007 B2 * | 12/2013 | Charron | ............... | F01D 9/023 60/796 |
| 9,127,554 B2 * | 9/2015 | Charron | ............... | F01D 9/02 |
| 9,528,706 B2 * | 12/2016 | Montgomery | ............... | F23R 3/425 |
| 10,465,907 B2 * | 11/2019 | Zong | ............... | F23R 3/04 |
| 10,550,853 B2 * | 2/2020 | Terauchi | ............... | F23R 3/04 |
| 10,605,266 B2 * | 3/2020 | Terauchi | ............... | F01D 9/023 |
| 10,718,222 B2 * | 7/2020 | King | ............... | B33Y 80/00 |
| 2003/0010014 A1 * | 1/2003 | Bland | ............... | F01D 9/06 60/39.37 |
| 2003/0035723 A1 * | 2/2003 | Decker | ............... | F01D 5/141 415/211.2 |
| 2005/0241317 A1 * | 11/2005 | Martling | ............... | F23R 3/46 60/772 |
| 2010/0021293 A1 * | 1/2010 | Schott | ............... | F04D 29/541 415/208.2 |
| 2010/0180605 A1 * | 7/2010 | Charron | ............... | F23R 3/425 60/796 |
| 2014/0072401 A1 * | 3/2014 | Powar | ............... | F01D 9/04 415/1 |
| 2015/0167986 A1 * | 6/2015 | Montgomery | ............... | F23R 3/425 60/726 |
| 2017/0067635 A1 * | 3/2017 | Zong | ............... | F23R 3/44 |
| 2018/0195722 A1 * | 7/2018 | Schott | ............... | F01D 9/04 |
| 2018/0274376 A1 * | 9/2018 | King | ............... | B33Y 80/00 |
| 2018/0298917 A1 * | 10/2018 | Terauchi | ............... | F04D 29/544 |
| 2018/0298918 A1 * | 10/2018 | Terauchi | ............... | F04D 29/545 |

\* cited by examiner

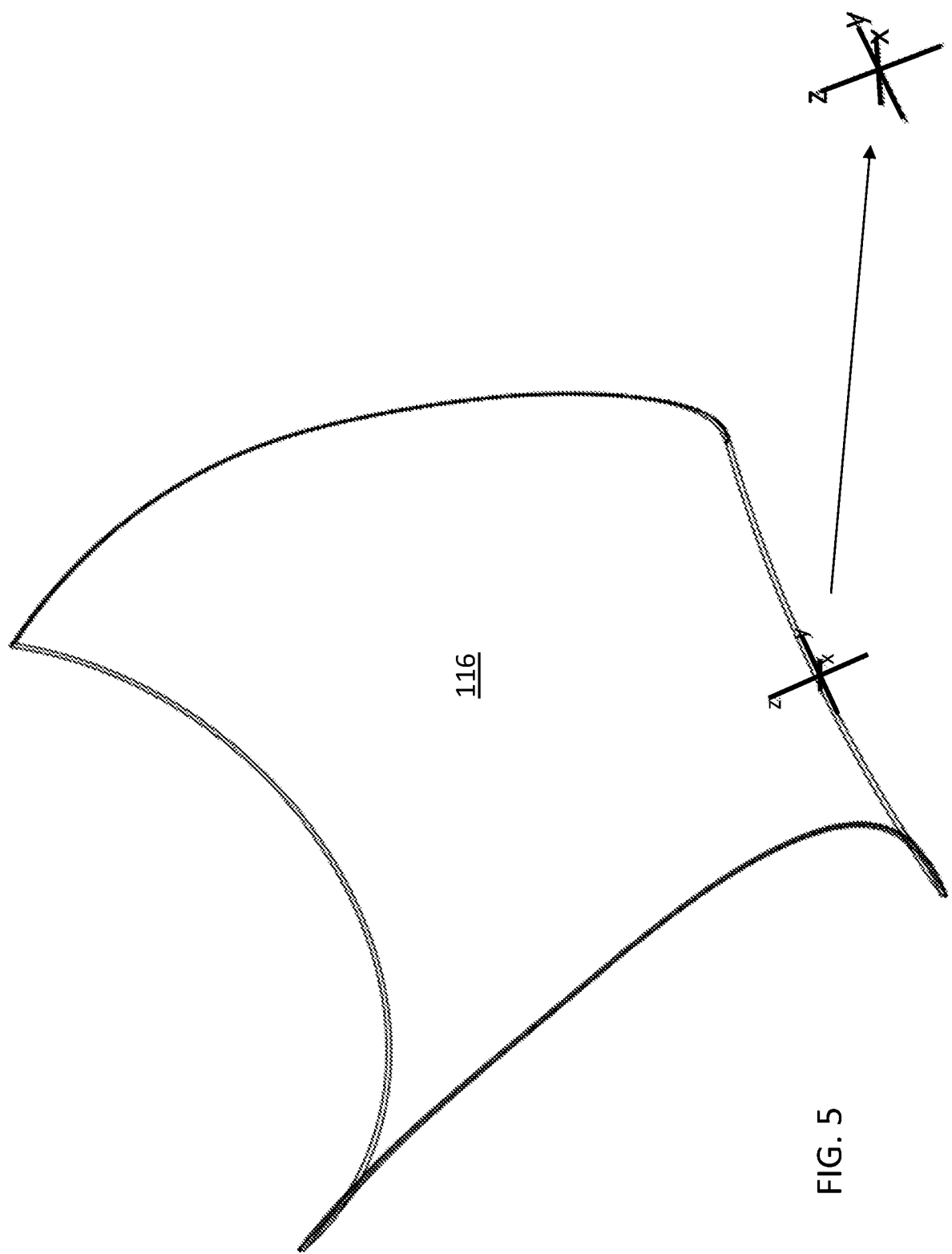

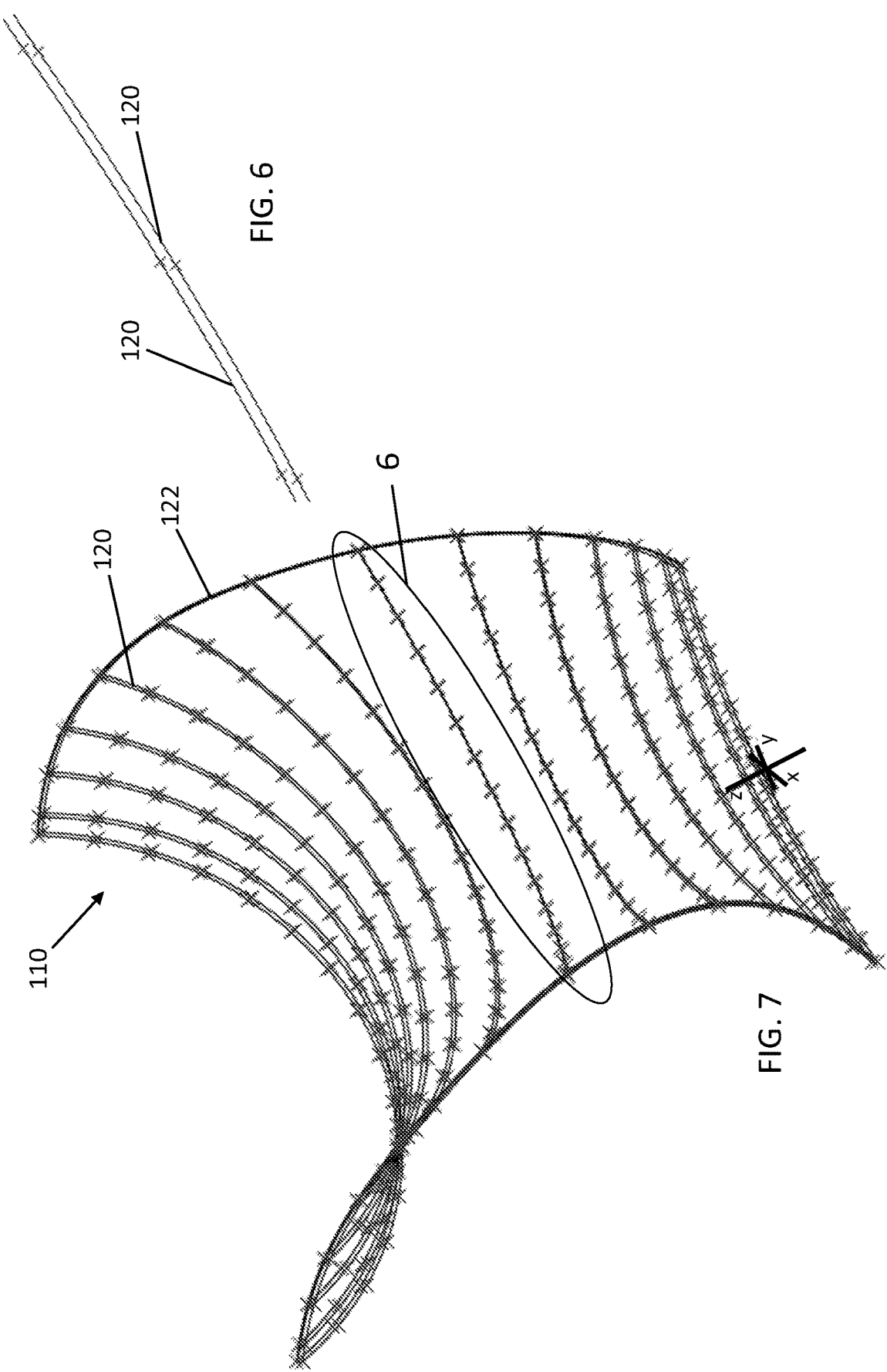

DIFFUSER GUIDE VANE WITH DEFLECTOR PANEL HAVING CURVED PROFILE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This disclosure relates generally to a guide vane for use in a compressor discharge region of a gas turbine engine and more specifically to surface profile for the diffuser guide vane.

BACKGROUND OF THE DISCLOSURE

A gas turbine engine typically comprises a multi-stage compressor coupled to a multi-stage turbine via an axial shaft. Air enters the gas turbine engine through the compressor where its temperature and pressure increase as it passes through subsequent stages of the compressor. The compressed air is then directed to one or more combustors where it mixes with a fuel source to create a combustible mixture. This mixture is ignited in the combustors to create a flow of hot combustion gases. These gases are directed into the turbine causing the turbine to rotate, thereby driving the compressor. The output of the gas turbine engine can be mechanical thrust through exhaust from the turbine or shaft power from the rotation of an axial shaft, where the axial shaft can drive a generator to produce electricity.

The compressor and turbine each comprise a plurality of rotating blades and stationary vanes having an airfoil extending into the flow of compressed air or flow of hot combustion gases. Each blade or vane has a particular set of design criteria which must be met in order to provide the necessary work to the passing flow through the compressor and the turbine.

The air from the compressor is directed to a compressor discharge plenum, which is a large volume area contained within the engine case and receives compressed air from the compressor and is in fluid communication with the combustion sections of the gas turbine engine. For industrial gas turbines having one or more transition ducts connecting the combustor to the turbine, the one or more transition ducts are positioned within the compressor discharge plenum. Compressed air in the compressor discharge plenum typically circulates throughout the plenum and can cool the one or more transition ducts before the air moves towards the combustion section. However, due to the large volume of air passing into the compressor discharge plenum, the airflow through the plenum can be non-uniform and recirculate in certain regions of the compressor discharge plenum, thus creating instabilities between the individual combustion systems due to the fluctuations in airflow.

BRIEF SUMMARY OF THE DISCLOSURE

The following presents a simplified summary of the disclosure to provide a basic understanding of some aspects thereof. This summary is not an extensive overview of the application. It is not intended to identify critical elements of the disclosure or to delineate the scope of the disclosure. Its sole purpose is to present some concepts of the disclosure in a simplified form as a prelude to the more detailed description that is presented elsewhere herein.

The present disclosure discloses a diffuser guide vane having a profile configured to direct a flow of compressed air from a compressor and towards a combustion system.

In an embodiment of the disclosure, a guide vane for a compressor discharge plenum is provided. The guide vane comprises a guide support system, a first side panel, a second side panel, and a deflector panel secured to the mounting system and extending between the first side panel and the second side panel. The deflector panel has a curved profile substantially in accordance with Cartesian coordinate values X, Y, and Z as set forth in Table 1. The X, Y, and Z values are measured in inches from a center point of a bottom surface of the deflector panel, such that when the coordinate values are connected by smooth continuing arcs, a plurality of profile sections are defined. The curved profile is formed when the profile sections are joined together with smooth curves.

In an alternate embodiment of the disclosure, a guide vane for a compressor discharge plenum is provided. The guide vane comprises a guide support system, a first side panel, a second side panel, and a deflector panel secured to the mounting system and extending between the first side panel and the second side panel. The deflector panel has a curved profile within an envelope of approximately −0.050 to +0.050 inches in a direction normal to any surface of the curved profile. The curved profile is substantially in accordance with Cartesian coordinate values X, Y, and Z as set forth in Table 1 wherein the X, Y, and Z values are in inches and measured from a center point of a bottom surface of the deflector panel. When the coordinate values are connected by smooth continuing arcs, profile sections of the deflector panel are defined. The curved profile is formed by joining together the profile sections with smooth curves.

In yet another an embodiment of the disclosure, a compressor discharge region of a gas turbine engine is provided. The compressor discharge region comprises a compressor discharge case, a bullhorn bracket coupled to a portion of the compressor discharge case, and a guide vane for directing air flow in the compressor discharge plenum. The guide vane, which is coupled to the bullhorn bracket, comprises a guide support system, a first side panel, a second side panel, and a deflector panel secured to the mounting system and extending between the first side panel and the second side panel. The deflector panel has a curved profile substantially in accordance with Cartesian coordinate values X, Y, and Z as set forth in Table 1, where the X, Y, and Z values are in inches measured from a center point of a bottom surface of the deflector panel. When the coordinate values are connected by smooth continuing arcs, profile sections of the deflector panel are defined. The guide vane is formed by joining the profile sections together using smooth curves.

These and other features of the present disclosure can be best understood from the following description and claims.

BRIEF DESCRIPTION OF THE SEVERAL VIEWS OF THE DRAWINGS

The present disclosure is described in detail below with reference to the attached drawing figures, wherein:

FIG. 5 is an alternate perspective view of the deflector panel of FIG. 4 in accordance with an embodiment of the disclosure.

FIG. 6 depicts a pair of profile sections of the deflector panel in accordance with an embodiment of the disclosure.

FIG. 7 depicts the coordinate values, profile sections and curved profile of the deflector panel in accordance with an embodiment of the disclosure.

DETAILED DESCRIPTION

The present disclosure is intended for use in a gas turbine engine, such as a gas turbine used for power generation. As such, the present disclosure is capable of being used in a variety of turbine operating environments, regardless of the manufacturer.

As those skilled in the art will readily appreciate, a gas turbine engine is circumferentially disposed about an engine centerline, or axial centerline axis. The engine includes a compressor, a combustion section and a turbine with the turbine coupled to the compressor via an engine shaft. As is well known in the art, air compressed in the compressor mixes with fuel and is burned in the combustion section and expanded in the turbine. The air compressed in the compressor and the fuel mixture expanded in the turbine can both be referred to as a "hot gas stream flow" or combustion gases. The turbine includes rotors that, in response to the fluid expansion, rotate, thereby driving the compressor. The turbine comprises alternating rows of rotary turbine blades, and static airfoils, often referred to as vanes.

Figure 1:
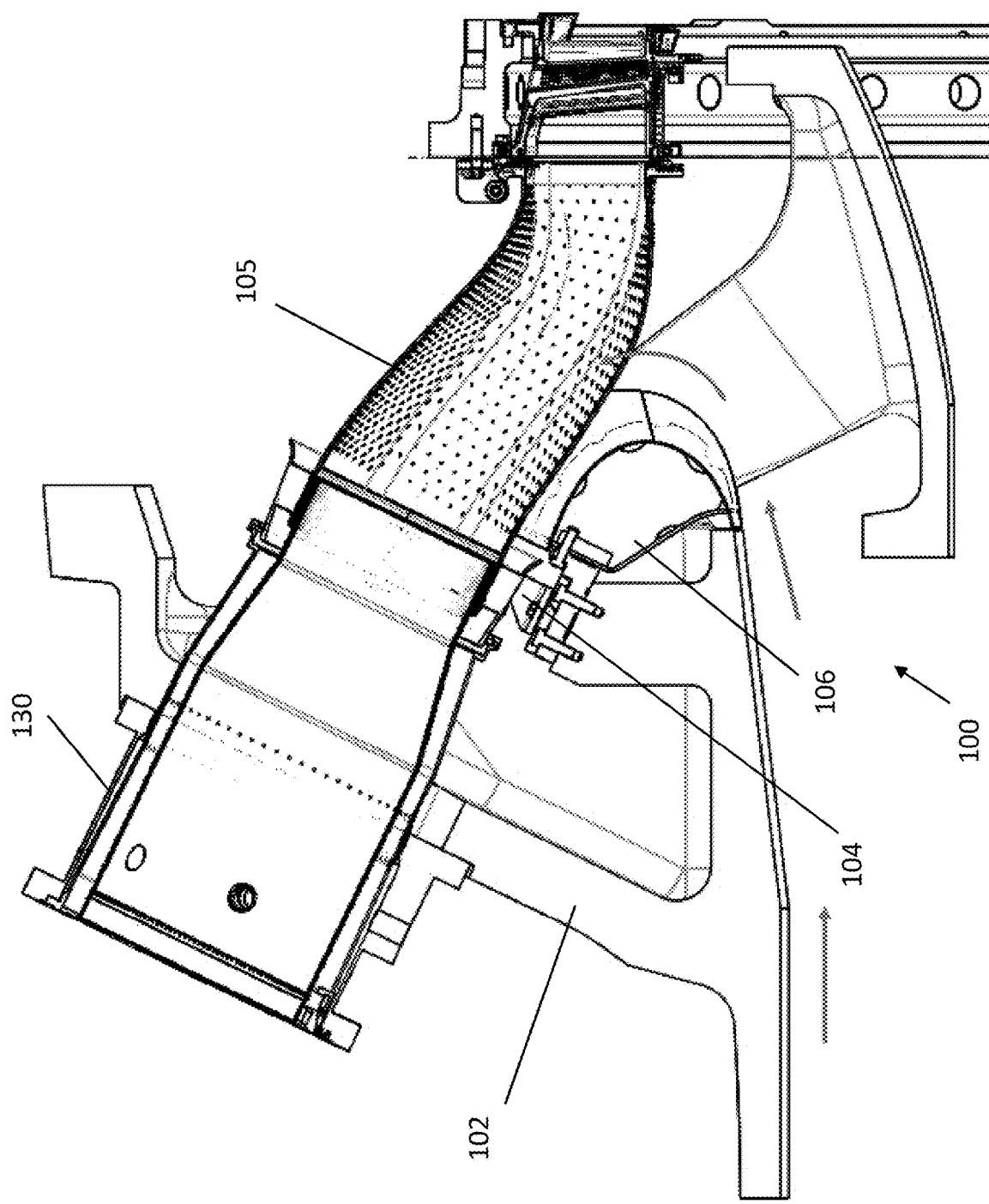
FIG. 1 is a side elevation view of a portion of a gas turbine engine in accordance with an embodiment of the disclosure.

The present disclosure is depicted in FIGS. 1-9. A portion of the gas turbine engine in which the present disclosure can operate is depicted in FIG. 1. A compressor discharge region 100 comprises a compressor discharge case 102 which envelopes or surrounds an exit area of the compressor and receives air from the compressor. A bullhorn bracket 104 is coupled to a portion of the compressor discharge case 102 and a guide vane 106 is provided for directing airflow from the compressor and through the compressor discharge plenum. The air flow is indicated by a series of arrows in FIG. 1.

Figure 2:
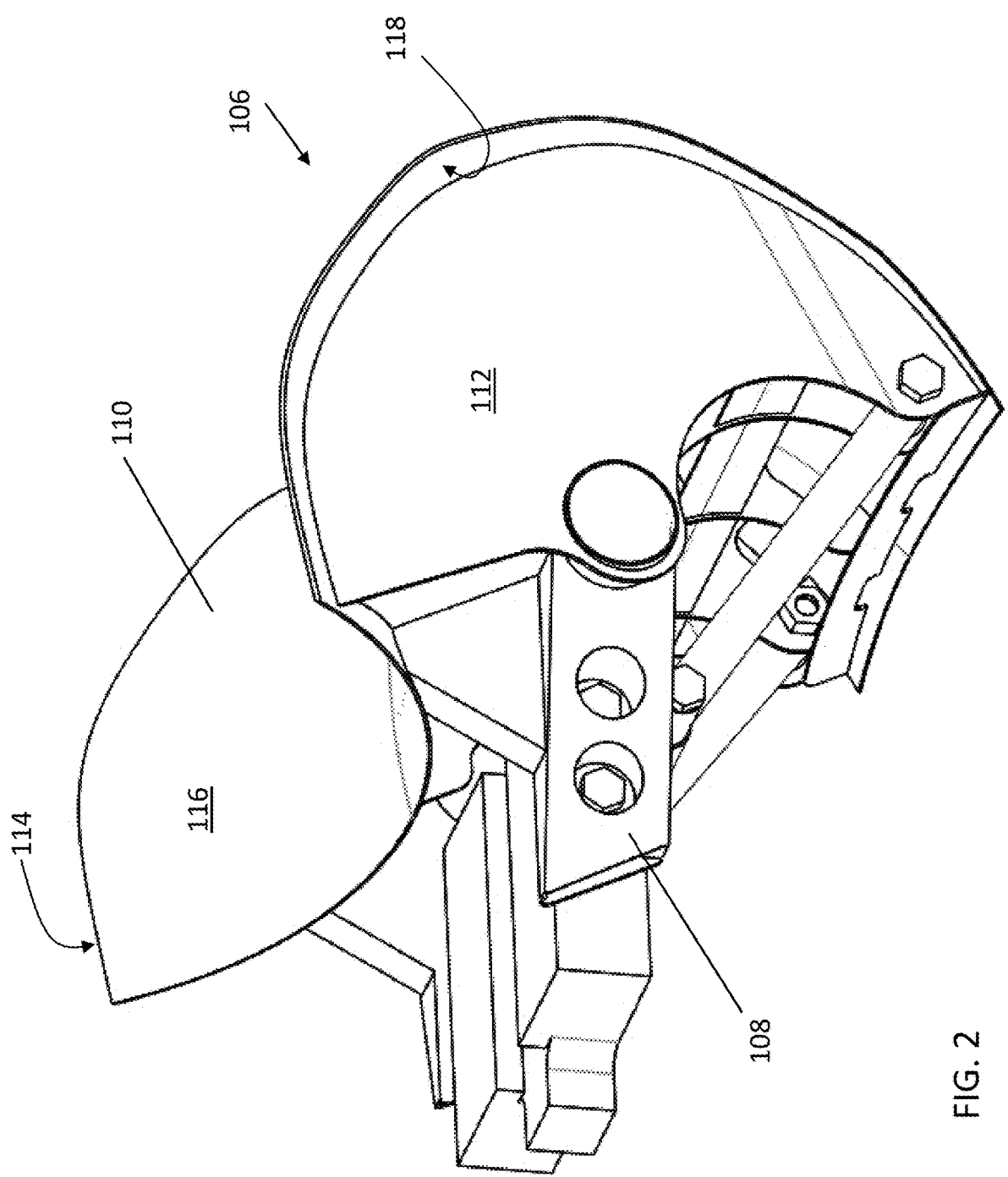
FIG. 2 is a perspective view of a guide vane in accordance with an embodiment of the disclosure.
Figure 3:
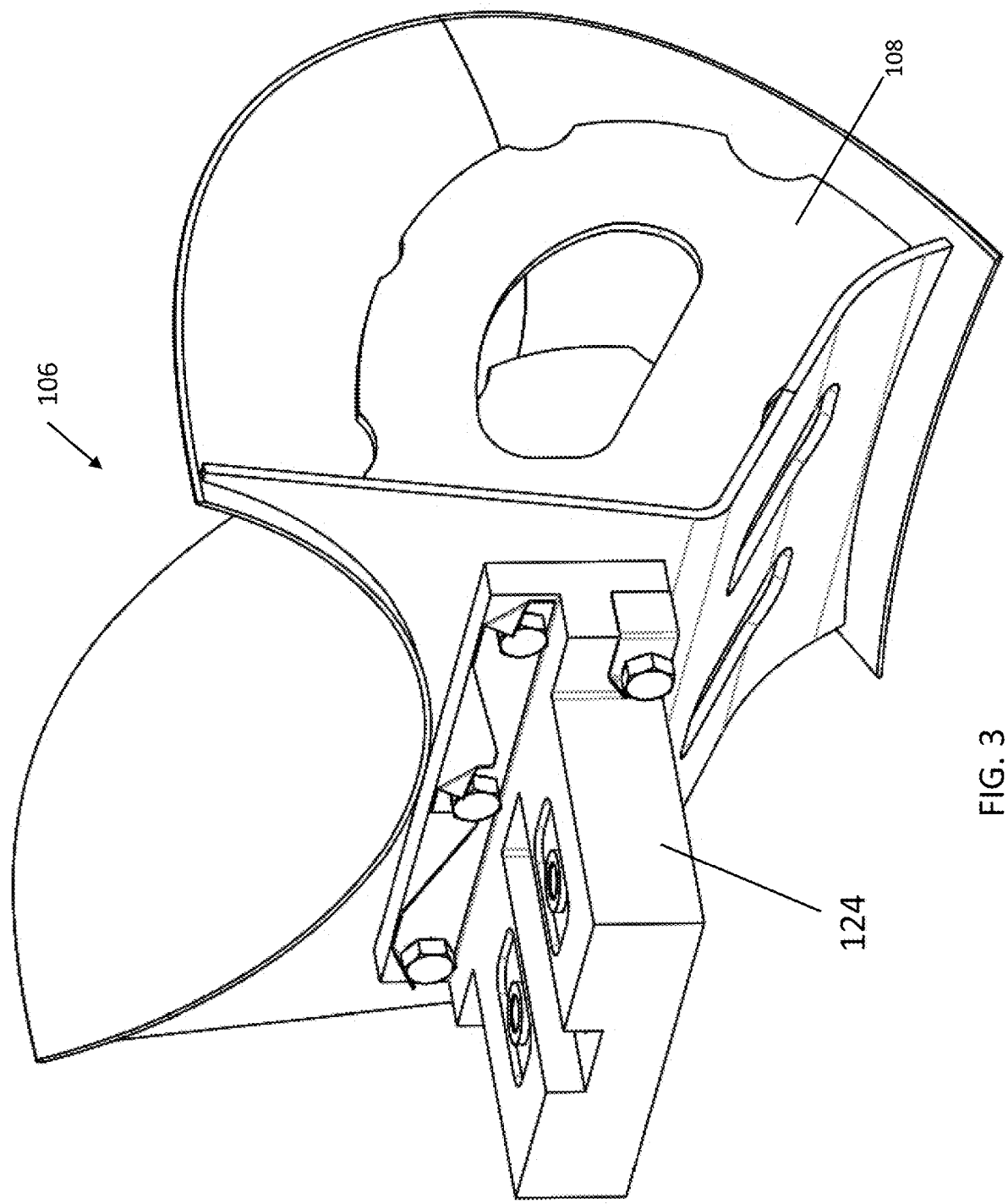
FIG. 3 is an alternate perspective view of a guide vane in accordance with an embodiment of the disclosure.
Figure 4:
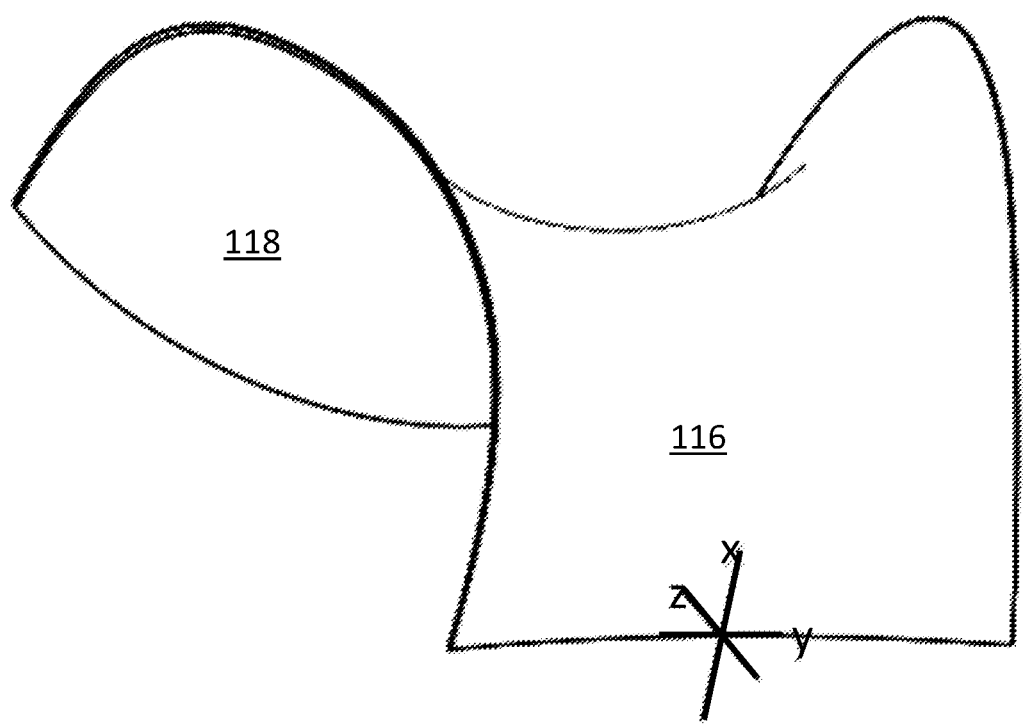
FIG. 4 is a perspective view of a deflector panel of the guide vane of FIGS. 2 and 3 in accordance with an embodiment of the disclosure.

Referring now to FIGS. 1-3, the guide vane 106 comprises a guide support system 108 having multiple individual components used in supporting a deflector panel 110 and for mounting the deflector panel in the proper location of the compressor discharge plenum 102. The exact configuration of the guide support system 108 can vary depending on the specific engine configuration. One such acceptable mounting configuration is to couple the guide vane 106 to the bullhorn bracket 104. The bullhorn bracket 104 is also typically used to support a transition duct 105.

The guide vane 106 further comprises a first side panel 112 and a second side panel 114, where the second side panel 114 is positioned generally parallel to the first side panel 112. The deflector panel 110 is secured to the guide support system 108 and extends between the first side panel 112 and the second side panel 114. The deflector panel 110 can be secured by a variety of means such as welding or a plurality of fasteners (not depicted).

Figure 8:
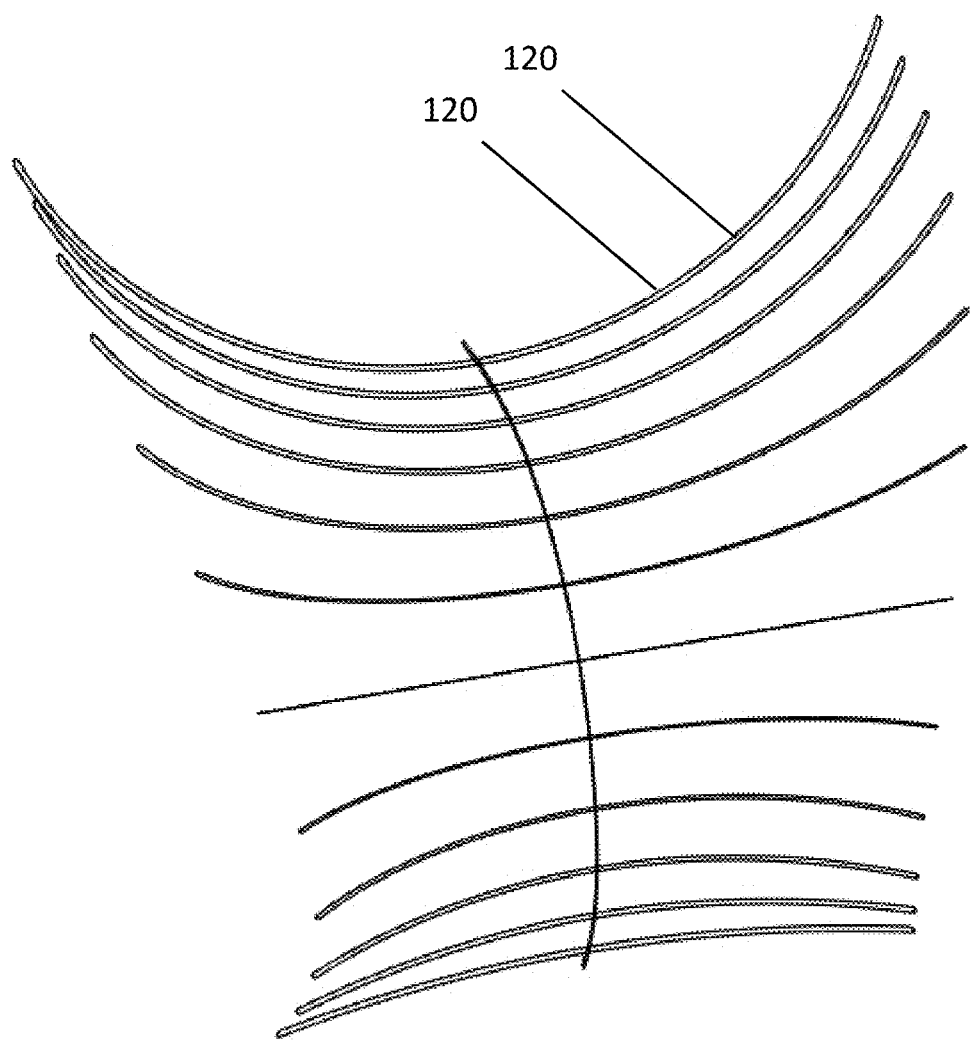
FIG. 8 depicts the profile sections of the deflector panel in accordance with an embodiment of the disclosure.
Figure 9:
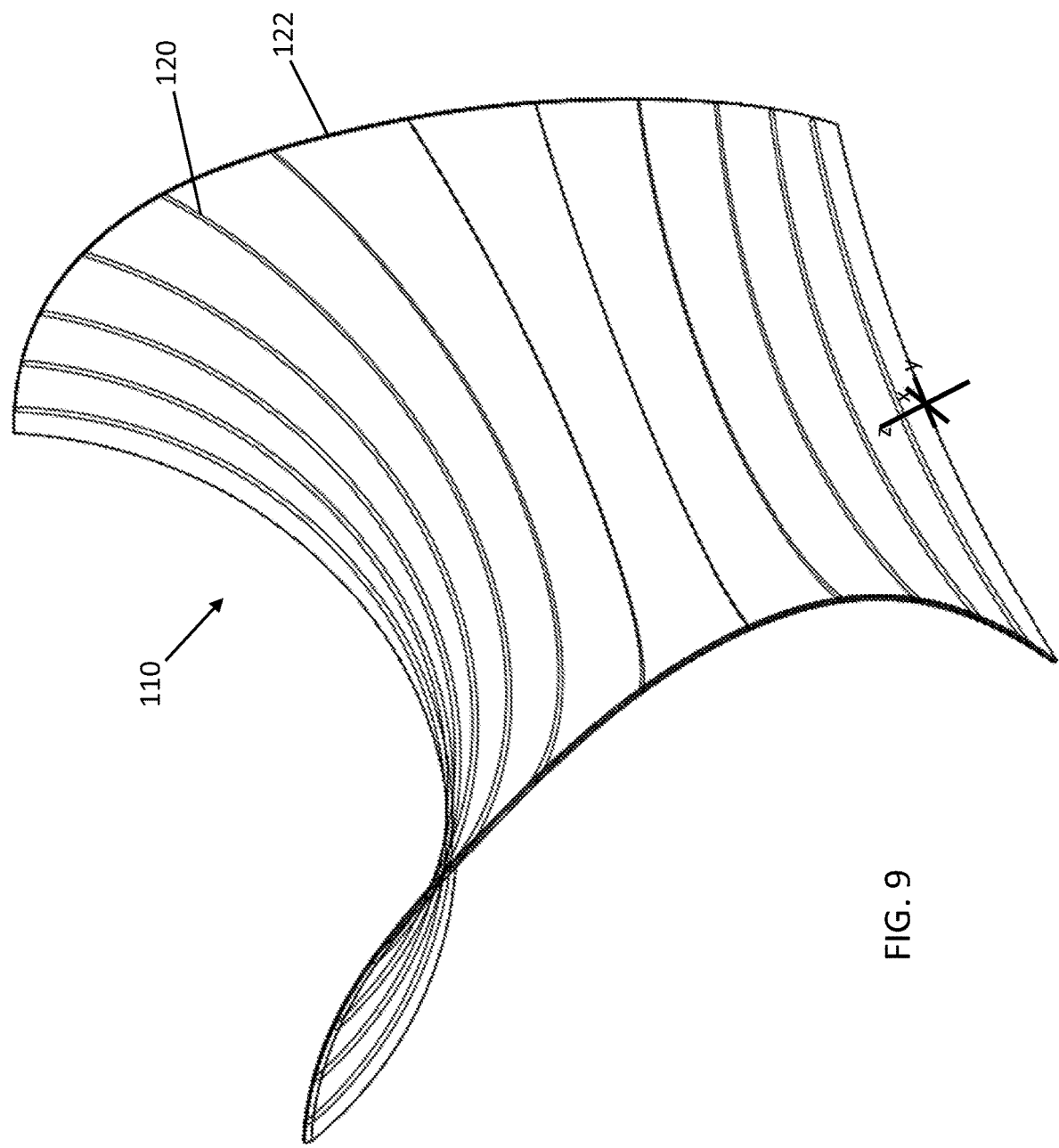
FIG. 9 depicts the profile sections and curved profile of the deflector panel in accordance with an embodiment of the disclosure

The deflector panel 110 has a curved profile substantially in accordance with Cartesian coordinate values of X, Y, and Z as set forth in Table 1. The X, Y, and Z values of Table 1 correspond to a series of points along opposing surfaces 116 and 118. The opposing surfaces 116 and 118 are typically at least 0.062 inches thick but may vary. The X, Y, and Z Cartesian coordinate values are measured in inches from a center point of a bottom surface of the deflector panel, as shown in FIG. 7. The representative Cartesian coordinates are shown in FIGS. 6 and 7 and are connected by smooth continuing arcs to thereby define profile sections 120 of the deflector panel 110. The profile sections 120, which are shown in FIG. 8, are joined together smoothly to form a curved profile 122 of the deflector panel 110. The curved profile is shown in FIG. 9.

For the embodiment of the disclosure discussed herein and depicted in FIGS. 2-9, the deflector panel 110 has a height of approximately 18 inches, as measured from a midpoint of the lower most section of the deflector panel to an upper most section at the opposing end of the deflector panel. For purposes of defining the deflector panel 110, this origin corresponds to a Z value of 0.000.

The guide vane 106 further comprises a mounting system 124 for securing the guide vane to the compressor discharge case 102. The guide vane 106 can be secured to the compressor discharge case 102, via the bullhorn bracket 104, with a plurality of fasteners, as depicted in FIG. 1. The guide vane 106, which serves to direct compressed air from all areas of the compressor, may be fabricated in multiple parts in order to create the overall guide vane shape in the compressor discharge region 100.

The deflector panel 110 operates in a relatively low temperature environment, as compressed air exiting the engine compressor enters the compressor discharge case at approximately 700 deg. F. As such, the deflector panel 110 and other related components can be fabricated from a low temperature material such as stainless steel. The deflector panel 110 can be fabricated as a forging or casting.

The values of Table 1 for determining the profile of the deflector panel 110 are generated and shown to three decimal places. These values in Table 1 are for a nominal, uncoated deflector panel. However, there are typical manufacturing tolerances as well as possible coatings, which can cause the profile of the deflector panel to vary from the values of Table 1. Accordingly, in an alternate embodiment of the disclosure, the deflector panel 110 can have a curved profile 122 within an envelope of approximately −0.050 to +0.050 inches in a direction normal to any surface location of the curved profile. This range for the curved profile accounts for manufacturing variations or assembly issues of the guide vane 106.

A number of improvements in cooling and engine operation occur as a result of this disclosure. First, the deflector panel 110 of the guide vane 106 forms an important part of a flow path in the compressor discharge region 100 between a compressor and a combustor of a gas turbine engine, such that airflow from the compressor enters the compressor discharge region 100 and is directed radially outward towards the transition duct 105, thus improving cooling of the transition ducts. Furthermore, the deflector panel 110 also helps direct airflow forward towards an inlet of the combustor 130.

In addition, the curved profile 122 for deflector panel 110 is configured such that it helps to maintain attachment of the airflow from the compressor, reducing the likelihood of flow separation and pressure loss.

The coordinate values given in Table 1 below provide a nominal profile envelope for the deflector panel disclosed herein.

TABLE 1

| X | Y | Z |
|---|---|---|
| 1.070 | 9.149 | 18.908 |
| 0.462 | 8.446 | 17.661 |
| −0.091 | 7.533 | 16.529 |
| −0.573 | 6.435 | 15.539 |
| −0.975 | 5.178 | 14.716 |
| −1.285 | 3.793 | 14.080 |
| −1.496 | 2.314 | 13.647 |
| −1.603 | 0.778 | 13.427 |
| −1.603 | −0.778 | 13.427 |
| −1.496 | −2.314 | 13.647 |
| −1.285 | −3.793 | 14.080 |
| −0.975 | −5.178 | 14.716 |
| −0.573 | −6.435 | 15.539 |
| −0.091 | −7.533 | 16.529 |
| 0.462 | −8.446 | 17.661 |
| 1.070 | −9.149 | 18.908 |
| 1.000 | 9.218 | 18.765 |
| 0.394 | 8.497 | 17.523 |
| −0.156 | 7.571 | 16.396 |
| −0.636 | 6.461 | 15.411 |
| −1.035 | 5.195 | 14.593 |
| −1.343 | 3.804 | 13.961 |
| −1.552 | 2.320 | 13.531 |
| −1.659 | 0.780 | 13.314 |
| −1.659 | −0.780 | 13.314 |
| −1.552 | −2.320 | 13.531 |
| −1.343 | −3.804 | 13.961 |
| −1.035 | −5.195 | 14.593 |
| −0.636 | −6.461 | 15.411 |
| −0.156 | −7.571 | 16.396 |
| 0.394 | −8.497 | 17.523 |
| 1.000 | −9.218 | 18.765 |
| 1.948 | 9.181 | 18.506 |
| 1.448 | 8.465 | 17.227 |
| 0.996 | 7.541 | 16.070 |
| 0.602 | 6.433 | 15.062 |
| 0.277 | 5.169 | 14.229 |
| 0.026 | 3.781 | 13.589 |
| −0.143 | 2.305 | 13.154 |
| −0.229 | 0.774 | 12.935 |
| −0.229 | −0.774 | 12.935 |
| −0.143 | −2.305 | 13.154 |
| 0.026 | −3.781 | 13.589 |
| 0.277 | −5.169 | 14.229 |
| 0.602 | −6.433 | 15.062 |
| 0.996 | −7.541 | 16.070 |
| 1.448 | −8.465 | 17.227 |
| 1.948 | −9.181 | 18.506 |
| 3.825 | 9.223 | 17.511 |
| 3.244 | 8.474 | 16.302 |
| 2.720 | 7.528 | 15.211 |
| 2.264 | 6.408 | 14.264 |
| 1.888 | 5.140 | 13.481 |
| 1.600 | 3.756 | 12.880 |
| 1.404 | 2.288 | 12.474 |
| 1.305 | 0.768 | 12.268 |
| 1.305 | −0.768 | 12.268 |
| 1.404 | −2.288 | 12.474 |
| 1.600 | −3.756 | 12.880 |
| 1.888 | −5.140 | 13.481 |
| 2.264 | −6.408 | 14.264 |
| 2.720 | −7.528 | 15.211 |
| 3.244 | −8.474 | 16.302 |
| 3.825 | −9.223 | 17.511 |
| 5.701 | 9.219 | 16.241 |
| 5.023 | 8.438 | 15.135 |
| 4.413 | 7.473 | 14.140 |
| 3.885 | 6.345 | 13.279 |
| 3.450 | 5.081 | 12.569 |
| 3.116 | 3.707 | 12.025 |
| 2.891 | 2.256 | 11.657 |
| 2.777 | 0.757 | 11.472 |
| 2.777 | −0.757 | 11.472 |
| 2.891 | −2.256 | 11.657 |
| 3.116 | −3.707 | 12.025 |
| 3.450 | −5.081 | 12.569 |
| 3.885 | −6.345 | 13.279 |
| 4.413 | −7.473 | 14.140 |
| 5.023 | −8.438 | 15.135 |
| 5.701 | −9.219 | 16.241 |
| 7.582 | 9.123 | 14.406 |
| 6.776 | 8.305 | 13.491 |
| 6.054 | 7.322 | 12.671 |
| 5.431 | 6.195 | 11.964 |
| 4.919 | 4.947 | 11.383 |
| 4.528 | 3.603 | 10.938 |
| 4.263 | 2.190 | 10.638 |
| 4.130 | 0.734 | 10.486 |
| 4.130 | −0.734 | 10.486 |
| 4.263 | −2.190 | 10.638 |
| 4.528 | −3.603 | 10.938 |
| 4.919 | −4.947 | 11.383 |
| 5.431 | −6.195 | 11.964 |
| 6.054 | −7.322 | 12.671 |
| 6.776 | −8.305 | 13.491 |
| 7.582 | −9.123 | 14.406 |
| 9.074 | 8.808 | 11.921 |
| 8.171 | 7.969 | 11.289 |
| 7.367 | 6.991 | 10.726 |
| 6.677 | 5.890 | 10.242 |
| 6.113 | 4.689 | 9.847 |
| 5.682 | 3.407 | 9.546 |
| 5.392 | 2.067 | 9.342 |
| 5.246 | 0.693 | 9.240 |
| 5.246 | −0.693 | 9.240 |
| 5.392 | −2.067 | 9.342 |
| 5.682 | −3.407 | 9.546 |
| 6.113 | −4.689 | 9.847 |
| 6.677 | −5.890 | 10.242 |
| 7.367 | −6.991 | 10.726 |
| 8.171 | −7.969 | 11.289 |
| 9.074 | −8.808 | 11.921 |
| 9.789 | 8.164 | 9.076 |
| 8.883 | 7.352 | 8.759 |
| 8.083 | 6.423 | 8.479 |
| 7.402 | 5.392 | 8.241 |
| 6.851 | 4.278 | 8.048 |
| 6.434 | 3.100 | 7.903 |
| 6.155 | 1.878 | 7.805 |
| 6.015 | 0.629 | 7.756 |
| 6.015 | −0.629 | 7.756 |
| 6.155 | −1.878 | 7.805 |
| 6.434 | −3.100 | 7.903 |
| 6.851 | −4.278 | 8.048 |
| 7.402 | −5.392 | 8.241 |
| 8.083 | −6.423 | 8.479 |
| 8.883 | −7.352 | 8.759 |
| 9.789 | −8.164 | 9.076 |
| 9.706 | 7.355 | 5.975 |
| 8.866 | 6.612 | 6.007 |
| 8.128 | 5.768 | 6.035 |
| 7.506 | 4.834 | 6.060 |
| 7.008 | 3.829 | 6.079 |
| 6.635 | 2.771 | 6.093 |
| 6.389 | 1.676 | 6.103 |
| 6.266 | 0.561 | 6.107 |
| 6.266 | −0.561 | 6.107 |
| 6.389 | −1.676 | 6.103 |
| 6.635 | −2.771 | 6.093 |
| 7.008 | −3.829 | 6.079 |
| 7.506 | −4.834 | 6.060 |
| 8.128 | −5.768 | 6.035 |
| 8.866 | −6.613 | 6.007 |
| 9.706 | −7.355 | 5.975 |
| 8.647 | 6.746 | 3.426 |
| 7.970 | 6.039 | 3.686 |

TABLE 1-continued

| X | Y | Z |
| --- | --- | --- |
| 7.381 | 5.249 | 3.913 |
| 6.887 | 4.386 | 4.102 |
| 6.493 | 3.466 | 4.254 |
| 6.201 | 2.504 | 4.366 |
| 6.009 | 1.513 | 4.440 |
| 5.913 | 0.506 | 4.477 |
| 5.913 | −0.506 | 4.477 |
| 6.009 | −1.513 | 4.440 |
| 6.201 | −2.504 | 4.366 |
| 6.493 | −3.466 | 4.254 |
| 6.887 | −4.386 | 4.102 |
| 7.381 | −5.249 | 3.913 |
| 7.970 | −6.039 | 3.686 |
| 8.647 | −6.746 | 3.426 |
| 6.983 | 6.433 | 1.655 |
| 6.521 | 5.697 | 1.990 |
| 6.120 | 4.909 | 2.281 |
| 5.784 | 4.076 | 2.525 |
| 5.514 | 3.206 | 2.720 |
| 5.312 | 2.309 | 2.867 |
| 5.178 | 1.393 | 2.964 |
| 5.111 | 0.466 | 3.013 |
| 5.111 | −0.466 | 3.013 |
| 5.178 | −1.393 | 2.964 |
| 5.312 | −2.309 | 2.867 |
| 5.514 | −3.206 | 2.720 |
| 5.784 | −4.076 | 2.525 |
| 6.120 | −4.909 | 2.281 |
| 6.521 | −5.697 | 1.990 |
| 6.983 | −6.433 | 1.655 |
| 5.001 | 6.411 | 0.531 |
| 4.750 | 5.613 | 0.839 |
| 4.531 | 4.792 | 1.107 |
| 4.345 | 3.950 | 1.334 |
| 4.194 | 3.091 | 1.518 |
| 4.080 | 2.218 | 1.659 |
| 4.003 | 1.335 | 1.753 |
| 3.964 | 0.446 | 1.800 |
| 3.964 | −0.446 | 1.800 |
| 4.002 | −1.335 | 1.753 |
| 4.080 | −2.218 | 1.659 |
| 4.194 | −3.091 | 1.518 |
| 4.345 | −3.950 | 1.334 |
| 4.531 | −4.792 | 1.107 |
| 4.750 | −5.613 | 0.839 |
| 5.001 | −6.411 | 0.531 |
| 3.050 | 6.566 | −0.086 |
| 2.931 | 5.716 | 0.154 |
| 2.826 | 4.855 | 0.362 |
| 2.738 | 3.985 | 0.539 |
| 2.666 | 3.108 | 0.682 |
| 2.612 | 2.225 | 0.792 |
| 2.575 | 1.337 | 0.866 |
| 2.556 | 0.446 | 0.903 |
| 2.556 | −0.446 | 0.903 |
| 2.575 | −1.337 | 0.866 |
| 2.612 | −2.225 | 0.792 |
| 2.666 | −3.108 | 0.682 |
| 2.738 | −3.985 | 0.539 |
| 2.826 | −4.855 | 0.362 |
| 2.931 | −5.716 | 0.154 |
| 3.050 | −6.566 | −0.086 |
| 1.231 | 6.778 | −0.416 |
| 1.175 | 5.886 | −0.242 |
| 1.127 | 4.988 | −0.093 |
| 1.086 | 4.087 | 0.031 |
| 1.054 | 3.182 | 0.131 |
| 1.030 | 2.275 | 0.206 |
| 1.014 | 1.366 | 0.256 |
| 1.006 | 0.455 | 0.282 |
| 1.006 | −0.455 | 0.282 |
| 1.014 | −1.366 | 0.256 |
| 1.030 | −2.275 | 0.206 |
| 1.054 | −3.182 | 0.131 |
| 1.086 | −4.087 | 0.031 |
| 1.127 | −4.988 | −0.093 |
| 1.175 | −5.886 | −0.242 |
| 1.231 | −6.778 | −0.416 |
| 1.889 | 9.247 | 18.355 |
| 1.391 | 8.514 | 17.081 |
| 0.941 | 7.576 | 15.930 |
| 0.550 | 6.456 | 14.929 |
| 0.227 | 5.184 | 14.102 |
| −0.021 | 3.791 | 13.467 |
| −0.190 | 2.310 | 13.036 |
| −0.275 | 0.776 | 12.818 |
| −0.275 | −0.776 | 12.818 |
| −0.190 | −2.310 | 13.036 |
| −0.021 | −3.791 | 13.467 |
| 0.227 | −5.184 | 14.102 |
| 0.550 | −6.456 | 14.929 |
| 0.941 | −7.576 | 15.930 |
| 1.391 | −8.514 | 17.081 |
| 1.889 | −9.247 | 18.355 |
| 3.752 | 9.282 | 17.360 |
| 3.174 | 8.517 | 16.158 |
| 2.654 | 7.558 | 15.074 |
| 2.202 | 6.427 | 14.133 |
| 1.829 | 5.152 | 13.357 |
| 1.543 | 3.763 | 12.762 |
| 1.349 | 2.291 | 12.359 |
| 1.251 | 0.769 | 12.155 |
| 1.251 | −0.769 | 12.155 |
| 1.349 | −2.291 | 12.359 |
| 1.543 | −3.763 | 12.762 |
| 1.829 | −5.152 | 13.357 |
| 2.202 | −6.427 | 14.133 |
| 2.654 | −7.558 | 15.074 |
| 3.174 | −8.517 | 16.158 |
| 3.752 | −9.282 | 17.360 |
| 5.612 | 9.272 | 16.096 |
| 4.938 | 8.476 | 14.997 |
| 4.333 | 7.498 | 14.009 |
| 3.809 | 6.361 | 13.155 |
| 3.378 | 5.090 | 12.452 |
| 3.047 | 3.712 | 11.913 |
| 2.824 | 2.258 | 11.549 |
| 2.712 | 0.758 | 11.365 |
| 2.712 | −0.758 | 11.365 |
| 2.824 | −2.258 | 11.549 |
| 3.047 | −3.712 | 11.913 |
| 3.378 | −5.090 | 12.452 |
| 3.809 | −6.361 | 13.155 |
| 4.333 | −7.498 | 14.009 |
| 4.938 | −8.476 | 14.997 |
| 5.612 | −9.272 | 16.096 |
| 7.470 | 9.169 | 14.279 |
| 6.669 | 8.337 | 13.370 |
| 5.953 | 7.343 | 12.557 |
| 5.336 | 6.209 | 11.856 |
| 4.829 | 4.955 | 11.280 |
| 4.441 | 3.607 | 10.840 |
| 4.179 | 2.191 | 10.542 |
| 4.047 | 0.735 | 10.392 |
| 4.047 | −0.735 | 10.392 |
| 4.179 | −2.191 | 10.542 |
| 4.441 | −3.607 | 10.840 |
| 4.829 | −4.955 | 11.280 |
| 5.336 | −6.209 | 11.856 |
| 5.953 | −7.343 | 12.557 |
| 6.669 | −8.337 | 13.370 |
| 7.470 | −9.169 | 14.279 |
| 8.940 | 8.849 | 11.827 |
| 8.043 | 7.997 | 11.199 |
| 7.245 | 7.010 | 10.640 |
| 6.561 | 5.903 | 10.161 |
| 6.002 | 4.696 | 9.769 |
| 5.575 | 3.411 | 9.471 |
| 5.288 | 2.069 | 9.269 |
| 5.143 | 0.693 | 9.168 |
| 5.143 | −0.693 | 9.168 |
| 5.288 | −2.069 | 9.269 |
| 5.575 | −3.411 | 9.471 |
| 6.002 | −4.696 | 9.769 |
| 6.561 | −5.903 | 10.161 |
| 7.245 | −7.010 | 10.640 |

TABLE 1-continued

| X | Y | Z |
|---|---|---|
| 8.043 | −7.997 | 11.199 |
| 8.940 | −8.849 | 11.827 |
| 9.647 | 8.208 | 9.026 |
| 8.746 | 7.386 | 8.711 |
| 7.951 | 6.448 | 8.433 |
| 7.275 | 5.410 | 8.196 |
| 6.727 | 4.291 | 8.005 |
| 6.313 | 3.109 | 7.860 |
| 6.036 | 1.883 | 7.763 |
| 5.897 | 0.630 | 7.715 |
| 5.897 | −0.630 | 7.715 |
| 6.036 | −1.883 | 7.763 |
| 6.313 | −3.109 | 7.860 |
| 6.727 | −4.291 | 8.005 |
| 7.275 | −5.410 | 8.196 |
| 7.951 | −6.448 | 8.433 |
| 8.746 | −7.386 | 8.711 |
| 9.647 | −8.208 | 9.026 |
| 9.575 | 7.412 | 5.980 |
| 8.736 | 6.659 | 6.012 |
| 7.999 | 5.805 | 6.040 |
| 7.379 | 4.863 | 6.064 |
| 6.881 | 3.851 | 6.084 |
| 6.510 | 2.786 | 6.098 |
| 6.263 | 1.685 | 6.108 |
| 6.141 | 0.564 | 6.112 |
| 6.141 | −0.564 | 6.112 |
| 6.263 | −1.685 | 6.108 |
| 6.510 | −2.786 | 6.098 |
| 6.881 | −3.851 | 6.084 |
| 7.379 | −4.863 | 6.064 |
| 7.999 | −5.805 | 6.040 |
| 8.736 | −6.659 | 6.012 |
| 9.575 | −7.412 | 5.980 |
| 8.535 | 6.807 | 3.469 |
| 7.857 | 6.091 | 3.729 |
| 7.266 | 5.292 | 3.956 |
| 6.772 | 4.421 | 4.147 |
| 6.378 | 3.493 | 4.298 |
| 6.085 | 2.523 | 4.411 |
| 5.892 | 1.524 | 4.485 |
| 5.796 | 0.510 | 4.522 |
| 5.796 | −0.510 | 4.522 |
| 5.892 | −1.524 | 4.485 |
| 6.085 | −2.523 | 4.411 |
| 6.378 | −3.493 | 4.298 |
| 6.772 | −4.421 | 4.147 |
| 7.266 | −5.292 | 3.957 |
| 7.857 | −6.091 | 3.729 |
| 8.535 | −6.807 | 3.469 |
| 6.886 | 6.489 | 1.725 |
| 6.424 | 5.745 | 2.061 |
| 6.022 | 4.949 | 2.352 |
| 5.684 | 4.108 | 2.597 |
| 5.414 | 3.231 | 2.793 |
| 5.211 | 2.327 | 2.940 |
| 5.077 | 1.404 | 3.037 |
| 5.010 | 0.469 | 3.086 |
| 5.010 | −0.469 | 3.086 |
| 5.077 | −1.404 | 3.037 |
| 5.211 | −2.327 | 2.940 |
| 5.414 | −3.231 | 2.793 |
| 5.684 | −4.108 | 2.597 |
| 6.022 | −4.949 | 2.352 |
| 6.424 | −5.745 | 2.061 |
| 6.886 | −6.489 | 1.725 |
| 4.920 | 6.448 | 0.630 |
| 4.670 | 5.644 | 0.937 |
| 4.451 | 4.817 | 1.204 |
| 4.266 | 3.971 | 1.431 |
| 4.115 | 3.107 | 1.615 |
| 4.001 | 2.229 | 1.755 |
| 3.923 | 1.342 | 1.850 |
| 3.885 | 0.448 | 1.897 |
| 3.885 | −0.448 | 1.897 |
| 3.923 | −1.342 | 1.850 |
| 4.001 | −2.229 | 1.755 |
| 4.115 | −3.107 | 1.615 |
| 4.266 | −3.971 | 1.431 |
| 4.451 | −4.817 | 1.204 |
| 4.670 | −5.644 | 0.937 |
| 4.920 | −6.448 | 0.630 |
| 2.990 | 6.571 | 0.035 |
| 2.872 | 5.719 | 0.272 |
| 2.769 | 4.857 | 0.478 |
| 2.681 | 3.987 | 0.653 |
| 2.610 | 3.109 | 0.796 |
| 2.555 | 2.225 | 0.905 |
| 2.519 | 1.337 | 0.978 |
| 2.500 | 0.446 | 1.015 |
| 2.500 | −0.446 | 1.015 |
| 2.519 | −1.337 | 0.978 |
| 2.555 | −2.225 | 0.905 |
| 2.610 | −3.109 | 0.796 |
| 2.681 | −3.987 | 0.653 |
| 2.768 | −4.857 | 0.478 |
| 2.872 | −5.719 | 0.272 |
| 2.990 | −6.571 | 0.035 |
| 1.188 | 6.738 | −0.284 |
| 1.133 | 5.851 | −0.113 |
| 1.086 | 4.959 | 0.033 |
| 1.047 | 4.063 | 0.155 |
| 1.015 | 3.163 | 0.253 |
| 0.991 | 2.261 | 0.326 |
| 0.975 | 1.358 | 0.376 |
| 0.967 | 0.453 | 0.401 |
| 0.967 | −0.453 | 0.401 |
| 0.975 | −1.358 | 0.376 |
| 0.991 | −2.261 | 0.326 |
| 1.015 | −3.163 | 0.253 |
| 1.047 | −4.063 | 0.155 |
| 1.086 | −4.959 | 0.033 |
| 1.133 | −5.851 | −0.113 |
| 1.188 | −6.738 | −0.284 |
| 0.000 | −6.925 | −0.548 |
| 0.000 | −6.008 | −0.411 |
| 0.000 | −5.088 | −0.293 |
| 0.000 | −4.166 | −0.196 |
| 0.000 | −3.242 | −0.118 |
| 0.000 | −2.317 | −0.060 |
| 0.000 | −1.391 | −0.022 |
| 0.000 | −0.464 | −0.002 |
| 0.000 | 0.464 | −0.002 |
| 0.000 | 1.391 | −0.022 |
| 0.000 | 2.317 | −0.060 |
| 0.000 | 3.242 | −0.118 |
| 0.000 | 4.166 | −0.196 |
| 0.000 | 5.088 | −0.293 |
| 0.000 | 6.008 | −0.411 |
| 0.000 | 6.925 | −0.548 |
| 0.000 | 6.846 | −0.408 |
| 0.000 | 5.940 | −0.274 |
| 0.000 | 5.030 | −0.160 |
| 0.000 | 4.119 | −0.064 |
| 0.000 | 3.205 | 0.012 |
| 0.000 | 2.290 | 0.069 |
| 0.000 | 1.375 | 0.107 |
| 0.000 | 0.458 | 0.126 |
| 0.000 | −0.458 | 0.126 |
| 0.000 | −1.375 | 0.107 |
| 0.000 | −2.290 | 0.069 |
| 0.000 | −3.205 | 0.012 |
| 0.000 | −4.119 | −0.064 |
| 0.000 | −5.030 | −0.160 |
| 0.000 | −5.940 | −0.274 |
| 0.000 | −6.846 | −0.408 |

Although various embodiments of this disclosure have been disclosed, a worker of ordinary skill in this art would recognize that certain modifications would come within the scope of this disclosure. For that reason, the following claims should be studied to determine the true scope and content of this disclosure. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this disclosure is one well adapted to attain all the ends and objects hereinabove set forth together with other advantages which are obvious, and which are inherent to the structure.

It will be understood that certain features and subcombinations are of utility and may be employed without reference to other features and subcombinations. This is contemplated by and is within the scope of the claims.

Having thus described the disclosure, what is claimed is:

1. A guide vane for a compressor discharge plenum comprising:
   a guide support system;
   a first side panel and a second side panel; and,
   a deflector panel secured to a first mounting system, the deflector panel extending between the first side panel and the second side panel, the deflector panel having a curved profile substantially in accordance with Cartesian coordinate values of X, Y, and Z set forth in Table 1 wherein the X, Y, and Z values are in inches from a center point of a bottom surface of the deflector panel, and when connected by smooth continuing arcs, define profile sections of the deflector panel, which when joined smoothly with one another form the curved profile.

2. The guide vane of claim 1 forming a flow path in the compressor discharge plenum between a compressor and a combustor of a gas turbine engine.

3. The guide vane of claim 2, wherein the guide vane directs compressed air from the compressor to cool a transition duct and the combustor.

4. The guide vane of claim 1 further comprising a second mounting system for mounting the guide vane to a compressor discharge case.

5. The guide vane of claim 4, wherein the second mounting system is coupled to a bullhorn bracket, which in turn supports a transition duct.

6. The guide vane of claim 1, wherein the deflector panel is configured to reduce flow separation for air passing through the compressor discharge plenum.

7. The guide vane of claim 1, wherein the deflector panel has a height measured from a midpoint of a lower-most section to an upper most section of approximately 18 inches.

8. The guide vane of claim 1, wherein the deflector panel is fabricated from a stainless steel.

9. A guide vane for a compressor discharge plenum comprising:
   a guide support system;
   a first side panel and a second side panel; and,
   a deflector panel secured to a first mounting system, the deflector panel extending between the first side panel and the second side panel, the deflector panel having a curved profile within an envelope of approximately −0.050 to +0.050 inches in a direction normal to any surface location of the curved profile, where the curved profile is substantially in accordance with Cartesian coordinate values of X, Y, and Z set forth in Table 1 wherein the X, Y, and Z values are in inches from a center point of a bottom surface of the deflector panel, and when connected by smooth continuing arcs, define profile sections of the deflector panel, and which when joined smoothly with one another form the curved profile.

10. The guide vane of claim 9 forming a part of the compressor discharge plenum between a compressor and a combustor of a gas turbine engine.

11. The guide vane of claim 10, wherein the guide vane directs compressed air from the compressor to cool a transition duct and the combustor.

12. The guide vane of claim 9 further comprising a second mounting system for mounting the guide vane to a compressor discharge case.

13. The guide vane of claim 9, wherein the deflector panel is configured to reduce flow separation for air passing through the compressor discharge plenum.

14. The guide vane of claim 9, wherein the deflector panel has a height measured from a midpoint of a lower-most section to an upper most section of approximately 18 inches.

15. The guide vane of claim 9, wherein the deflector panel is fabricated from a stainless steel.

16. A compressor discharge region of a gas turbine engine comprising:
   a compressor discharge case;
   a bullhorn bracket coupled to a portion of the compressor discharge case; and,
   a guide vane for directing air flow in a compressor discharge plenum comprising a guide support system, a first side panel and a second side panel, and a deflector panel secured to the guide support system and extending between the first side panel and the second side panel, the deflector panel having a curved profile substantially in accordance with Cartesian coordinate values of X, Y, and Z set forth in Table 1 wherein the X, Y, and Z values are in inches from a center point of a bottom surface of the deflector panel, and when connected by smooth continuing arcs, define profile sections of the deflector panel, which when joined smoothly with one another form the curved profile, the guide vane coupled to the bullhorn bracket.

17. The compressor discharge region of claim 16, wherein the bullhorn bracket is also coupled to a transition duct.

18. The compressor discharge region of claim 17, wherein the guide vane further comprises a mounting system coupled to the bullhorn bracket.

19. The compressor discharge region of claim 18, wherein the deflector panel is configured to reduce flow separation for air passing through the compressor discharge plenum.

20. The guide vane of claim 19, wherein the deflector panel is fabricated from a stainless steel and has a height measured from a midpoint of a lower-most section to an upper most section of approximately 18 inches.

* * * * *